(12) United States Patent
Iwasaki

(10) Patent No.: US 7,520,971 B2
(45) Date of Patent: Apr. 21, 2009

(54) APPARATUS AND METHOD FOR ELECTRODEIONIZATION

(75) Inventor: Kunihiro Iwasaki, Tokyo (JP)

(73) Assignee: Kurita Water Industries Ltd., Shinjuku-ku, Tokyo (JP)

(*) Notice: Subject to any disclaimer, the term of this patent is extended or adjusted under 35 U.S.C. 154(b) by 244 days.

(21) Appl. No.: 11/480,918

(22) Filed: Jul. 6, 2006

(65) Prior Publication Data
US 2006/0266651 A1 Nov. 30, 2006

Related U.S. Application Data

(63) Continuation of application No. PCT/JP2004/019300, filed on Dec. 24, 2004.

(30) Foreign Application Priority Data
Jan. 9, 2004 (JP) ............................. 2004-004425

(51) Int. Cl.
*B01D 61/48* (2006.01)
*B01D 61/44* (2006.01)

(52) U.S. Cl. ..................... 204/524; 204/533; 204/536; 204/632

(58) Field of Classification Search ................. 204/632, 204/524, 533, 536
See application file for complete search history.

(56) References Cited

U.S. PATENT DOCUMENTS 6,649,037 B2 * 11/2003 Liang et al. ................. 204/632

FOREIGN PATENT DOCUMENTS

| JP | H04-72567 | 11/1992 |
|---|---|---|
| JP | 2001-025647 | 1/2001 |
| JP | 2003-071300 | 3/2003 |
| JP | 2003-126862 | 5/2003 |
| JP | 2004-073923 | 3/2004 |
| JP | 2004-082092 | 3/2004 |
| JP | 2004-105869 | 4/2004 |
| JP | 2004-167291 | 6/2004 |
| JP | 2004-344846 | 12/2004 |

* cited by examiner

Primary Examiner—Arun S Phasge
(74) Attorney, Agent, or Firm—Manabu Kanesaka

(57) ABSTRACT

An electric deionization device capable of sufficiently removing weak electrolyte components and producing processed desalting chamber having rectangular-parallelepiped frame 20, a compartment member 21 disposed in the frame 20 and, desirably, having conductivity, an ion exchange resin 23 filled in small chambes 22 formed by the compartment member 21, and an anion exchange membrane 24 and a cation exchange membrane 25 disposed so as to hold the frame 20. The compartment member 21 is formed in a hexagonal honeycomb shape. The ion exchange membrane 23 is the mixture of an anion exchange resin with a cation exchange resin, and its mixing ratio on the upstream side is different from that on the downstream side.

9 Claims, 5 Drawing Sheets

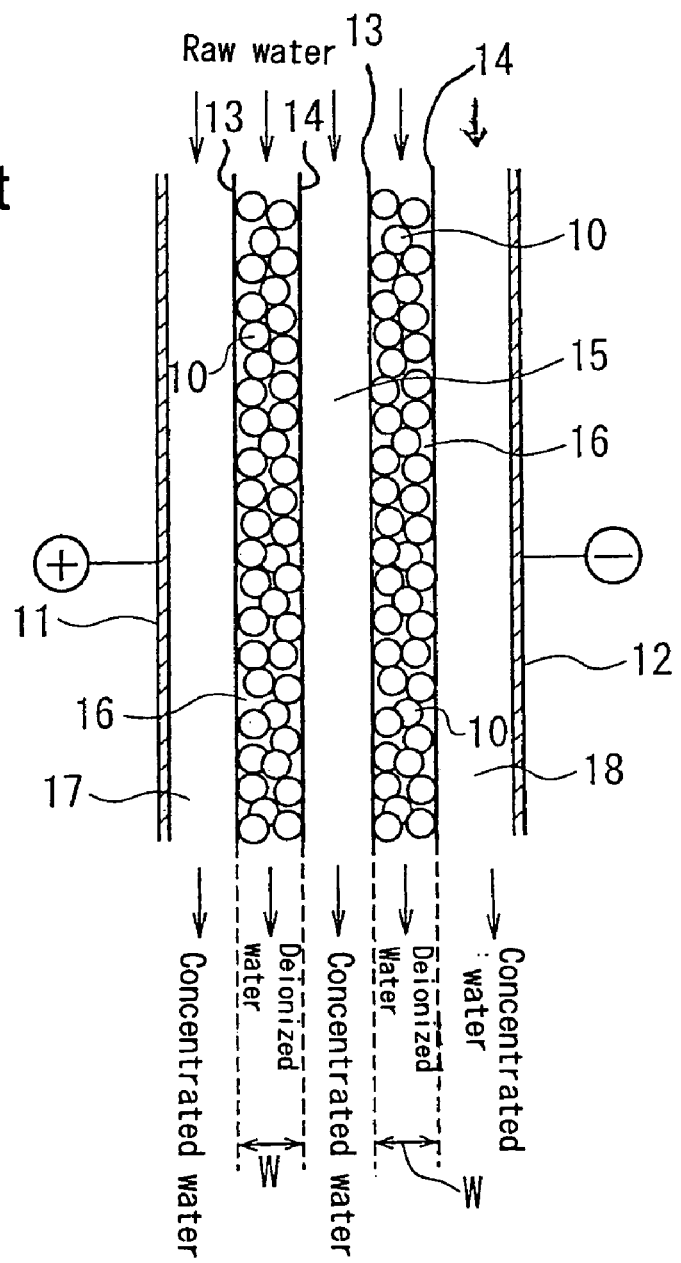

US 7,520,971 B2

APPARATUS AND METHOD FOR ELECTRODEIONIZATION

CROSS REFERENCE TO RELATED APPLICATION

This is a continuation application of PCT/JP2004/019300 filed on Dec. 24, 2004.

FIELD OF THE INVENTION

The present invention relates to an electrodeionization apparatus used for producing deionized water in various fields including semiconductor manufacturing, liquid crystal display manufacturing, pharmaceutical manufacturing, food processing, and the like. More particularly the present invention relates to the electrodeionization apparatus which produces treated water which is improved in resistivity and removing rate of weak electrolyte anions and is suitable to produce highly pure water continuously. Further more, the present invention relates to a method for electrodeionization which employs the electrodeionization apparatus.

BACKGROUND OF THE INVENTION

The electrodeionization apparatus used for producing the deionized water is employed in various fields including the semiconductor manufacturing plants, the liquid crystal display manufacturing plants, the food processing industry, the electric power plants, household equipments, laboratories and the like. FIG. 6 shows a conventional electrodeionization apparatus in which a plurality of anion exchange membranes 13 and a plurality of cation exchange membranes 14 are alternately arranged between electrodes (anode 11, cathode 12) in such a manner as to alternately form concentrating compartments 15 and desalting compartments 16, and the desalting compartments 16 are filled with ion exchangers 10. In FIG. 6, the reference numeral 17 denotes an anodic compartment and the numeral 18 denotes a cathodic compartment.

A part of the concentrated water flown out from the concentrating compartment 15 is fed into the anodic compartments 17 and the desalting compartments 18.

In an electrodeionization apparatus, $H^+$ ions and $OH^-$ ions are formed by dissociation of the water to continuously regenerate the ion exchangers filled in the desalting compartments so that the electrodeionization apparatus can efficiently deionize the water without regeneration with using agents which are employed in a conventional ion exchange apparatus which is widely used for desalting water. An electrodeionization apparatus produces highly pure water continuously, so that it is employed widely in a pure water producing apparatus or the like.

Generally, when the electrodeionization apparatus is applied with the electrical current exceeding the critical current density to deionize, $OH^-$ and $H^+$ are formed by water dissociation as described above to carry the electric charge. $H^+$ ion has mobility of $349.7\ cm^2\ \Omega^{-1} eq^{-1}$, which is very large in comparison with that of the other ions (30 to 70 $cm^2\ \Omega^{-1} eq^{-1}$). Therefore, particularly when the diluting compartment has a large thickness W, the difference of the mobilities between $H^+$ and $OH^-$ is increased so that $H^+$ tends to be quickly discharged to the concentrating compartments and $OH^-$ tends to remain in the desalting compartment. Furthermore, $Na^+$ and $K^+$ also tend to remain in the desalting compartments because these are monovalent and $H^+$ ion carries the electrons, while the multi-valent cations and anions including $Ca^{2+}$, $Mg^{2+}$ are discharged to the concentrating compartments with relative ease. As the result, the product water tends to include monovalent alkali such as NaOH and KOH so that the product water (deionized water) becomes to contain Na ions at a high concentration (Na leak phenomenon).

An electrodeionization apparatus in which a desalting compartment is provided with vertical partition ribs for dividing the desalting compartment into cells being long in the vertical direction is disclosed in JP4-72567B. According to this electrodeionization apparatus having the desalting compartment divided into long cells by ribs in which ion exchange resins are filled respectively, the channelizing phenomenon where the flow of water from the inlet to the outlet of the desalting compartment is partially one-sided is prevented and the ion exchange resins in the desalting compartment are prevented from being compressed or moved.

The desalting compartments are filled with an equal amount of anion exchange resins and cation exchange resins so that the volume ratio of the anion exchange resins is 50 vol. %.

In the electrodeionization apparatus of JP4-72567B, the number of the cells is limited because the cells are formed by dividing the desalting compartment in the vertical direction. That is a large number of cells can not be formed in the apparatus. Further, the flow of the water in a lateral direction is blocked by the ribs, so that the contact efficiency between the water and the ion exchange resins is poor. In addition, the ion exchange resins are compressed at lower portions of the cells so that the cells have a vacancy at upper portions thereof, whereby the rate of filling the ion exchange resins tends to be poor.

The applicant disclosed, in JP2001-25647A, an electrodeionization apparatus which overcomes problems described above, which has high contact efficiency between water and ion exchanger, and which has high filling density of the ion exchanger. The applicant also disclosed, in JP2003-126862A, that this type of electrodeionization apparatus is improved in a desalting-efficiency when it has 60 to 80 vol. % of a volume ratio of anion exchange resins in the desalting compartments.

These electrodeionization apparatuses have desalting compartments, each of which is divided into a plurality of cells by a partition member, and ion exchange resins are filled in the respective cells. At least a part of the partition member facing the cell is inclined relative to an average flow direction of the water in the desalting compartment. The inclined part of the partition member allows permeation of the water, but prevents the ion exchanger to pass therethrough. Therefore, at least a part of the water flowing into the desalting compartment should flow obliquely relative to the average flow direction of water, so that the water is dispersed overall the desalting compartment, thereby improving the contact efficiency between water and ion exchanger and improving the deionization property.

When a plurality of cells are arranged along the membrane surface both in the average flow direction of water and a direction perpendicular to the average flow direction, (for example, when the apparatus has a large number of cells which are arranged vertically and laterally), the contact efficiency between water and ion exchanger becomes extremely high. Since the height of each cell is low, the ion exchanger is scarcely compressed. A vacancy is not formed at an upper portion in the cell, and the cell is filled evenly with the ion exchanger.

Generally, in an electrodeionization apparatus, ions contained in water to be treated move from a desalting compartment to a concentrating compartment depending on a potential difference between electrodes. Therefore, weak electrolytes including carbonic acid, silica and the like are hard to be removed from the water to be treated. For example, in an electrodeionization apparatus in which the anion exchange resin ratio is 50 volume % as described in JP4-72567B, the removal rate of silica is as low as about 70 to 90%.

JP2003-126862A above referred discloses the electrodeionization apparatus in which partition members are provided in a desalting compartment to divide the desalting compartment into a plurality of cells surrounded by the partition members and a cation exchange membrane and an anion exchange membrane, and the cells are filled with a mixture containing an anion exchange resin and a cation exchange resin at a mixing ratio of the anion exchange resin to the total amount of the anion exchange resin and the cation exchange resin of 60 to 80 volume %, in order to improve the removal rate of weak electrolytes.

The ratio of the anion exchange resin is made high in this Japanese publication due to the following reason:

Carbonic acid ($CO_2$) as a weak electrolyte changes to bicarbonate ion by ionization reaction with hydroxide ion ($OH^-$) ($CO_2 + OH^- \rightarrow HCO_3^-$).

The bicarbonate ion moves from the desalting compartment to the concentrating compartment through the anion exchange membrane. Therefore, it is important for removal of carbonic acid first to promote the ionization reaction, and secondly to improve the mobility of the bicarbonate ion. In order to promote the ionization reaction of carbonic acid (formation of bicarbonate ion), $OH^-$ ion is required to be fed, and it is brought by dissociation of water ($H_2O \rightarrow H^+ + OH^-$).

The water dissociates between the ion exchange resins and between the ion exchange resin and the ion exchange membrane. The hydrogen ion and the hydroxide ion produced between the ion exchange resins have a short lifetime because they associate with each other again in the desalting compartment. Therefore, the $OH^-$ ions produced between the ion exchange resin and the ion exchange membrane, especially between the cation exchange membrane and anion exchange membrane are effective for ionizing carbonic acid. As the amount ratio of the anion exchange resin is made higher, the contact ratio of the anion exchange resin to the cation exchange membrane becomes higher, thereby the amount of the $OH^-$ ions to be produced increases. As a result, the ionization-reaction of carbonic acid is promoted.

As the amount ratio of the anion exchange resin increases, the amount of $OH^-$ ions to be produced also increases, but the removing rate of $Na^+$ ions is deteriorated because the amount of $H^+$ ions decreases, thereby the treated water is deteriorated in resistivity.

In JP2003-126862A, Na leakage is prevented by adopting the structure of the electrodeionization apparatus in JP2001-25647A above referred (in which a desalting compartment is divided into a plurality of cells), which is superior in the deionizing property.

[Patent Reference 1] JP4-72567B
[Patent Reference 2] JP2001-25647A
[Patent Reference 3] JP2003-126862A As the concentration of carbonic acid increases in water, the equivalent electrical conductance also increases in accordance thereto whereby the current density required for deionization becomes higher than that in conventional apparatuses. When the anion exchange resin is filled in a desalting compartment in a large amount ratio, a voltage applied between the electrodes should be higher than that when the anion exchange resin is filled therein with an amount ratio of 50%, in order to make the current density high. When the anion exchange resin is filled in the desalting compartment in an increased amount ratio, the cation resin is filled therein in a decreased amount ratio. When the volume ratio of the anion exchange resin in the desalting compartment is increased from 60% to 70%, pathway of ions via the anion exchange resin increases by about three times, but pathway of ions via the cation exchange resin decreases to one tenth due to reduction of cation exchange resin ratio from 40% to 30%.

As described above, as the current density becomes higher, the amount of $H^+$ ions produced by the dissociation of water increases. Both $Na^+$ ions and $H^+$ ions move competitively via the cation exchange resin having the reduced pathway, but the pathway is occupied by $H^+$ ions with priority due to a very large mobility thereof. As a result thereof, $Na^+$ ions become hard to move the pathway, electrical resistance increases and voltage applied to the electrodes is increased.

In case that anion exchange resin is filled in a desalting compartment merely in a large amount ratio like as JP2003-126862, the current density is not increased, resulting that carbonic acid can not be removed sufficiently and that resistivity of treated water increases. Since the rise of voltage leads to the rise of electric power consumption, it is uneconomical.

SUMMARY OF THE INVENTION

An object of the present invention is to provide an electrodeionization apparatus and an electrodeionization method which provide treated water having extremely high purity and low concentration of weak electrolytic anion with sufficient current density even when a voltage applied thereto is low.

An electrodeionization apparatus of a first aspect of the invention has a plurality of cation exchange membranes and a plurality of anion exchange membranes which are alternately arranged between electrodes in such a manner as to alternately form desalting compartments and concentrating compartments and the desalting compartments, the desalting compartments being filled with ion exchange resins, water to be treated being introduced into the desalting compartments, concentrated water being introduced into the concentrating compartments, and the ion exchange resins being a mixture of an anion exchange resin and a cation exchange resin, wherein a mixing ratio of the anion exchange resin to the total amount of the anion exchange resin and the cation exchange resin is 66 to 80 volume % at an upper stream zone in each desalting compartment and 50 to 65 volume % at a lower stream zone in each desalting compartment.

An electrodeionization apparatus of a second aspect of the invention has a plurality of cation exchange membranes and a plurality of anion exchange membranes which are alternately arranged between electrodes in such a manner as to alternately form desalting compartments and concentrating compartments and the desalting compartments, the desalting compartments being filled with ion exchange resins, water to be treated being introduced into the desalting compartments, concentrated water being introduced into the concentrating compartments, and the ion exchange resins being a mixture of an anion exchange resin and a cation exchange resin, wherein a mixing ratio of the anion exchange resin to the total amount of the anion exchange resin and the cation exchange resin is 50 to 65 volume % at an upper stream zone in each desalting compartment and 66 to 80 volume % at a lower stream zone in each desalting compartment.

An electrodeionization method of a third aspect of the invention employs the electrodeionization apparatus of either the first aspect or the second aspect, and the apparatus is operated at a current density of 300 mA/dm$^2$ or more.

An electrodeionization method of a fourth aspect of the invention employs the electrodeionization apparatus of either the first aspect or the second aspect, and the apparatus desalts water to be treated having an Na ion concentration of 300 ppb or more.

BRIEF DESCRIPTION OF THE DRAWINGS

FIG. 6 is an exploded perspective view showing an electrodeionization apparatus according to the conventional one.

DETAILED DESCRIPTION OF THE PREFERRED EMBODIMENTS

When an electrodeionization apparatus has an area in which a ratio of anion exchange resin is 66 to 80 volume % in an upper stream zone or a lower stream zone in a desalting compartment, weak electrolytes are sufficiently removed in this area.

The electrodeionization apparatus of the first aspect has the desalting compartment filled with the ion exchange resin. The lower stream zone near the exit of the desalting compartment is filled with the ion exchange resins, 50 to 65 volume % of which is anion exchange resin. In this lower stream zone, water is easily dissociated (hereinafter sometimes referred to as "split"). Cation exchange resin in this zone has enough pathway to sufficiently move both H ions and Na ions produced by split in the first aspect, so that Na leakage is prevented and current density is increased without voltage rise.

The electrodeionization apparatus of the second aspect has the desalting compartment filled with the ion exchange resin. The upper stream zone near the inlet of the desalting compartment is filled with the ion exchange resins, 50 to 65 volume % of which is anion exchange resin. In this upper stream zone, Na ions are removed at a high rate so that the amount of Na ions flowing down to the lower stream zone is reduced. Hence, Na leakage is prevented, moving load of Na ions is reduced, and current density is increased without voltage rise.

Figure 1:
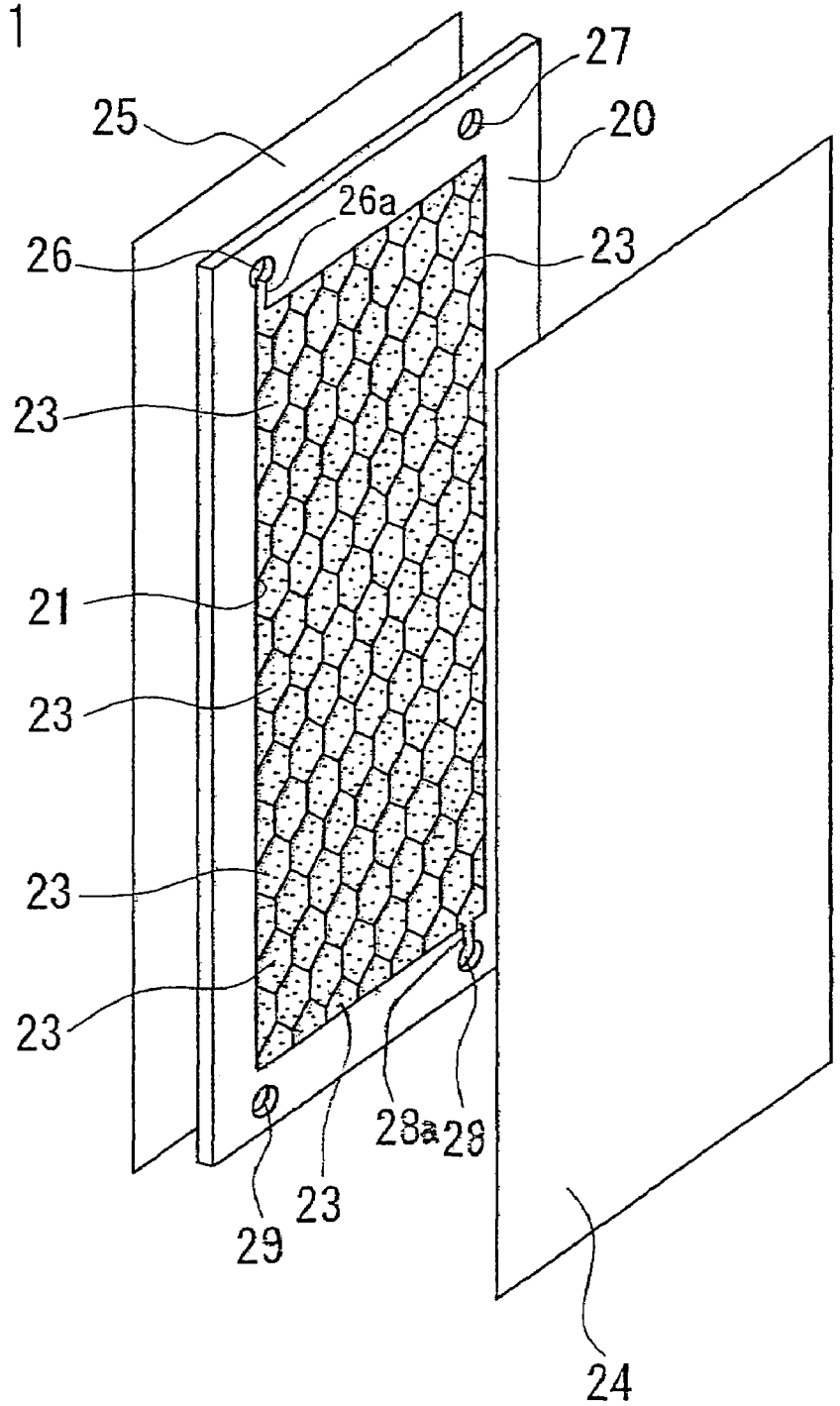
FIG. 1 is an exploded perspective view showing the structure of a desalting compartment according to an embodiment.
Figure 2:
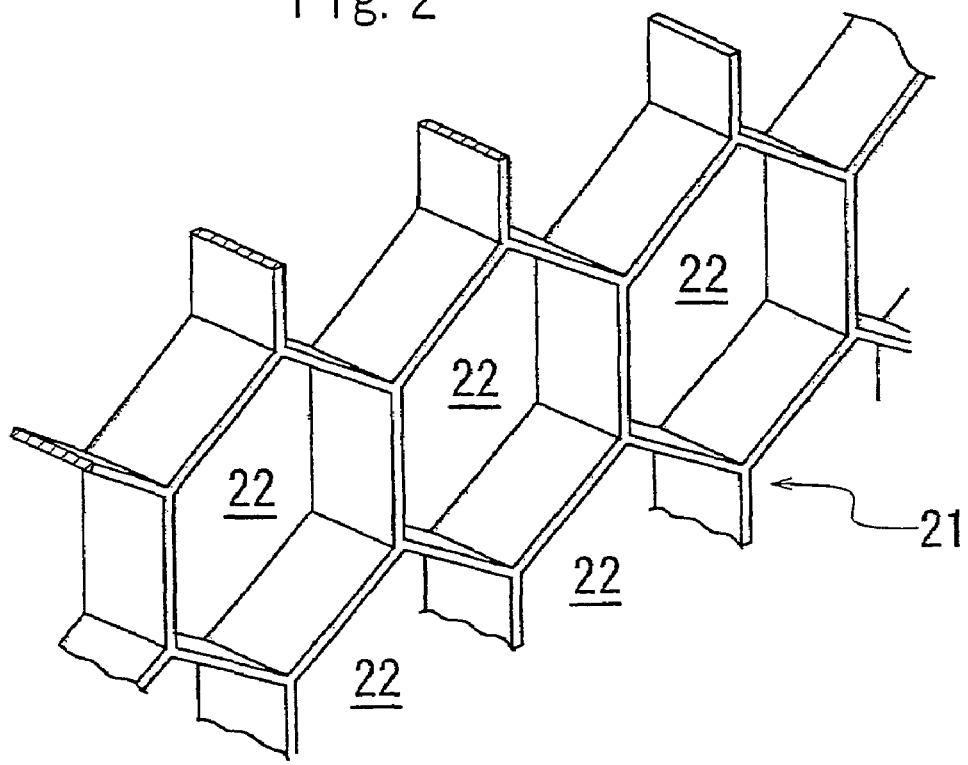
FIG. 2 is a perspective view showing a main part of a partition member.
Figure 3:
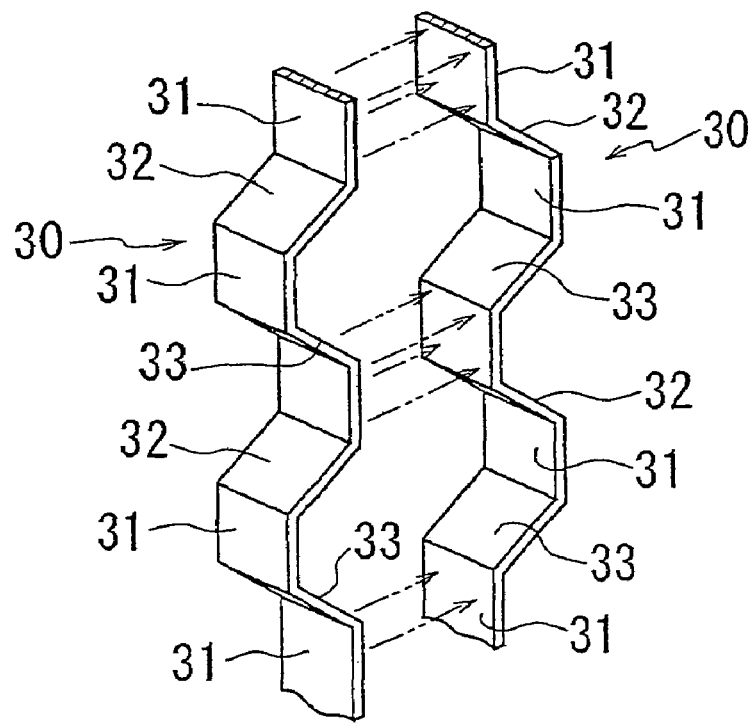
FIG. 3 is an exploded perspective view of the partition member.
Figure 4:
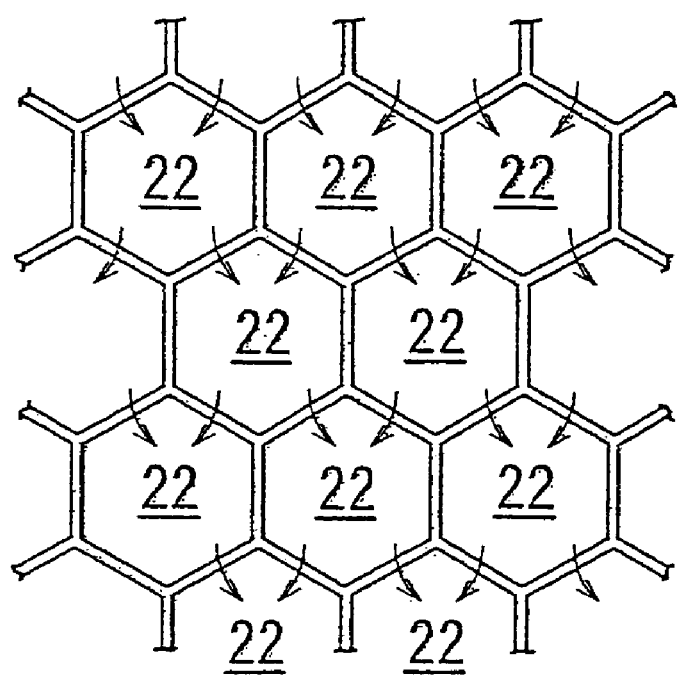
FIG. 4 is a front view illustrating the water flowing condition of the partition member.

Hereinafter, embodiments of the present invention will be described with reference to the attached drawings. FIG. 1 is an exploded perspective view showing the structure of a desalting compartment according to an embodiment, FIG. 2 is a perspective view showing a main part of a partition member, FIG. 3 is an exploded perspective view of the partition member, and FIG. 4 is a front view illustrating the water flowing condition of the partition member.

The desalting compartment has a rectangular frame 20, a partition member 21 and disposed in the frame 20 preferably having conductivity, an ion exchange resin 23 filled in cells 22 formed by the partition member 21, an anion exchange membrane 24 and a cation exchange membrane 25 which are disposed to sandwich the frame 20.

The frame 20 is provided with a flow inlet 26 for introducing raw water to be treated and a flow inlet 27 for concentrated water in an upper portion thereof and with a flow outlet 28 for desalted water and a flow outlet 29 for concentrated water formed in a lower portion thereof. The flow inlet 26 and the flow outlet 28 are connected to the inside of the frame 20 through a notch-like channels 26*a*, 28*a*, respectively.

Though only one channel 26*a* is illustrated to communicate with only the left top cell in FIG. 1, actually a plurality of channels 26*a* are formed in the upper portion of the frame 20 to uniformly distribute the raw water into the respective top cells aligned in the lateral direction, that is, the channels 26*a* directly communicate with the respective top cells. In the same manner, though only one channel 28*a* is illustrated to communicate with only the right bottom cell in FIG. 1, actually a plurality of channels 28*a* are formed in the lower portion of the frame 20 so as to directly communicate with the respective bottom cells.

The partition member 21 according to this embodiment is in a honeycomb form of a hexagonal shape in which a large number of cells are arranged in vertical and lateral directions in such a manner that a pair of sides of each cell 22 extend in the longitudinal direction of the frame 20, i.e. in the vertical direction.

The partition member 21 may be previously formed as an integral part or may be formed by combining a plurality parts. For example, as shown in FIG. 3, the partition member 21 may be formed by connecting vertical surfaces 31 of zigzag plates 30 as shown in FIG. 3. Each zigzag plate 30 comprises inclined surfaces 32, 33 which are connected at an angle of 120° with the vertical surfaces 31. To connect the vertical surfaces 31, adhesives may be employed. The zigzag plate 30 is made of material which is permeable to water but not permeable to ion exchanger, e.g. woven fabric, non-woven fabric, mesh, and porous material. The zigzag plate 30 is preferably formed to have rigidity by using synthetic resin or metal having acid resistance and alkali resistance. The vertical surfaces 31 may be permeable or not permeable to water.

The partition member 21 may be fitted in the frame 20. The frame 20 may be provided with a water permeable sheet or a mesh attached to one side thereof and the partition member 21 may be bonded to the sheet or the mesh.

The other structure of the electrodeionization apparatus according to the embodiment is the same as that of the aforementioned conventional one of FIG. 6.

When the desalting operation is conducted by passing raw water through this electrodeionization apparatus, the raw water introduced into the desalting compartment flows through the partition member 21 surrounding each cell 22 so as to flow into adjacent cells 22 and thus gradually flows downwardly. During this, the water is deionized. Finally, the water reaches the bottom of the desalting compartment and flows out to the flow outlet 28 through the channels 28*a*. Through the flow outlet 28, the water is took out from the electrodeionization apparatus as the desalted water.

The general direction of water in the desalting compartment is a downward vertical direction because the channels 26*a* for introducing raw water exist at the top of the frame 20 and the channels 28*a* for taking out the desalted water exist at the bottom of the frame 20. The partition member 21 at upper portions and lower portions of the respective cells is inclined relative to the general direction of water, so that the water flows obliquely and downwardly from one cell 22 into the lower left cell 22 and the lower right cell 22. Therefore, the water flows substantially uniformly to all cells 22, thereby improving the contact efficiency between the water and the ion exchanger.

In this desalting compartment, since the cells 22 are relatively small, the downward pressure applied to the ion exchange resin in each cell by the self weight of the ion exchange resin and water pressure is low. Therefore, the ion exchange resin is not compressed in any of the cells 22, thereby preventing the ion exchange resin from being partially compressed at the lower portion of the cells.

Employed as the ion exchanger to be filled in the cells 22 is a mixture of an anion exchange resin and, a cation exchange resin. The desalting compartment has a first zone containing anion exchange resin at an extremely high ratio and a second zone containing anion exchange resin at an equal or slightly high ratio, so that the first zone is sometimes referred to "highly excessive zone" of anion exchange resin, and the second zone "slightly excessive zone" of anion exchange resin hereinafter. The highly excessive zone has a mixing ratio of the anion exchange resin to the total amount of the anion exchange resin and the cation exchange resin of 66 to 80 volume %, preferably 70 to 80%, and the slightly excessive zone has a mixing ratio of the anion exchange resin to the total amount of the anion exchange resin and the cation exchange resin of 50 to 65 volume %.

Figure 5A:
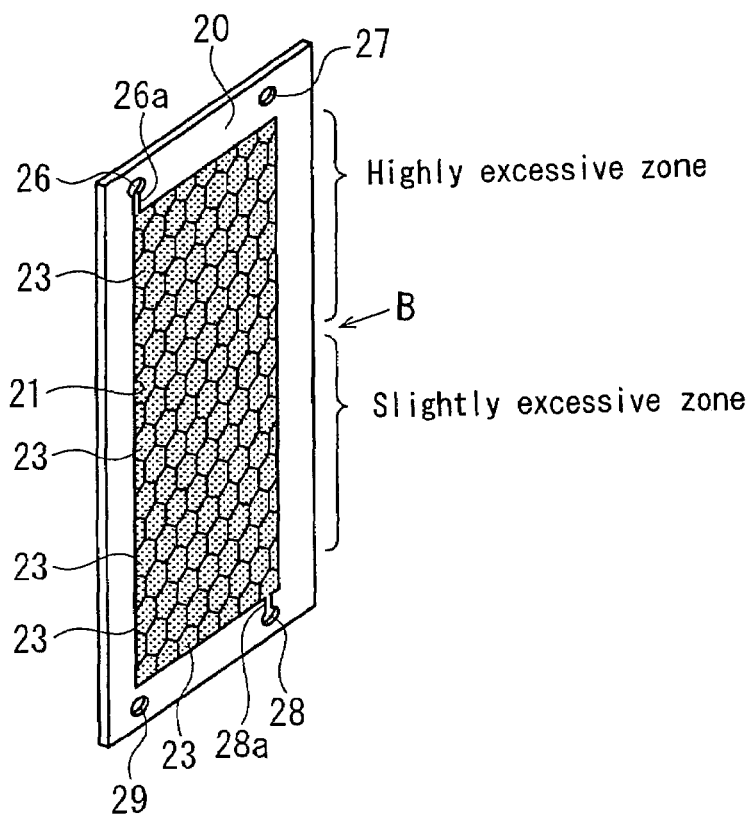
FIGS. 5*a* and 5*b* are perspective views showing a ratio of anion exchange resin in a desalting compartment.

In the first aspect, as shown in FIG. 5a, the highly excessive zone is located in the upstream side in the desalting compartment, and the slightly excessive zone is located in the downstream side in the desalting compartment.

Figure 5B:
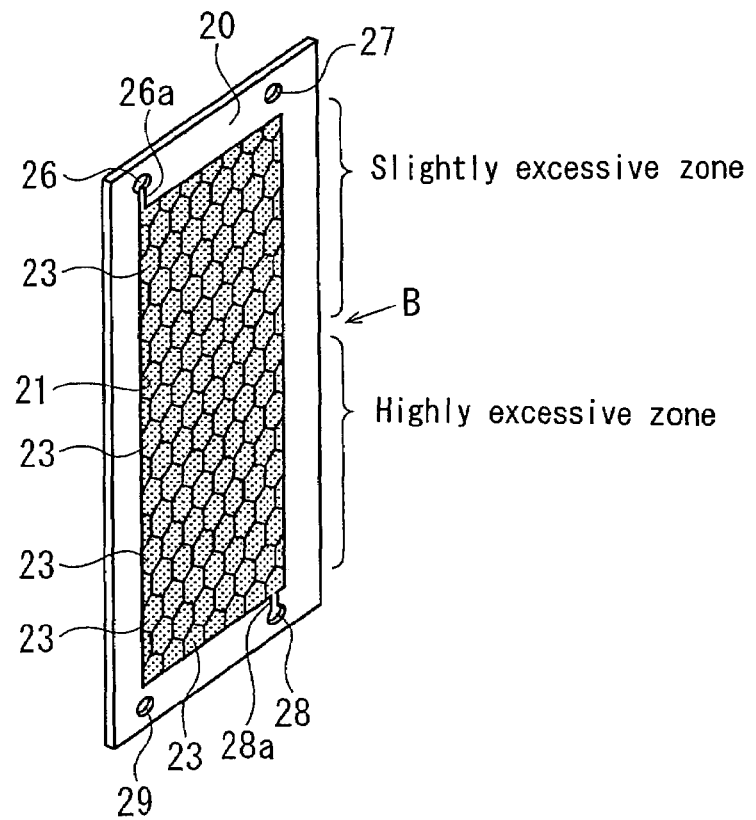

In the second aspect, as shown in FIG. 5b, the slightly excessive zone is located in the upstream side in the desalting compartment, and the highly excessive zone is located in the downstream side in the desalting compartment.

In both aspects of FIGS. 5a and 5b, the boundary B between the highly excessive zone and the slightly excessive zone is preferably located in the range of 25 to 75%, especially 40 to 60% away from the inlet of the desalting compartment in an average flow direction in the desalting compartment (in a direction from the top to the bottom in FIGS. 5a and 5b).

When the ratio of anion exchange resin in the highly excessive zone is lower than 66 volume %, the amount of $OH^-$ ions produced by water dissociation is insufficient and carbonic acid is ionized to bicarbonate ion at an insufficient rate, thereby removal rate of the carbonic acid is decreased. When the ratio of anion exchange resin in the highly excessive zone is higher than 80 volume %, removal rate of cations including $Na^+$ ions decreases, thereby the concentration of $Na^+$ ion and the like in the treated water is increased. When the ratio of anion exchange resin is in the range of 66 to 80 volume % in the highly excessive zone, carbonic acid, $Na^+$ ion and the like are sufficiently removed, and further ionization of silica, which is a weak acid, is promoted so that removal rate of silica is increased. When the ratio of anion exchange resin in the slightly excessive zone is lower than 50 volume %, anions tend to leak from this zone. When the ratio of anion exchange resin is higher than 65 volume % in the slightly excessive zone, cations tend to leak from this zone, thereby the effect of the invention can not be obtained.

The desalting compartment may-have, between the highly excessive zone and the slightly excessive zone, a moderately excessive zone where a ratio of the anion exchange resin is between those in the highly excessive zone and the slightly excessive zone. The ratio of the anion exchange resin may vary within the above range in both the highly excessive zone and the slightly excessive zone. The ratio may be increased or decreased continuously from the upstream side to the downstream side in each zone within the above range.

The apparatus according to the invention can be operated at a current density of 300 mA/dm$^2$ or more, for example, 300 to 120 mA/dm$^2$, so that treated water having a high resistivity of 10 M Ω·cm or higher can be produced even when raw water to be treated has an Na ion concentration of 300 ppb or more, for example, 300 to 2000 ppb.

Though the cells are hexagonal in FIGS. 1 through 4, the cells may be quadrangular e.g. rhombic. The partition member may be a triangle-type partition member composed of triangular cell. The partition member may form cells having other shapes. The apparatus may have no cells, wherein the apparatus has no partition member.

In the electrodeionization apparatus of the present invention, the projected area to the ion exchange membrane of the cells is preferably 1 to 100 cm$^2$, particularly 5 to 80 cm$^2$, more particularly 10 to 50 cm$^2$. The distance between a pair of the anion exchange membrane and the cation exchange membrane via the desalting compartment i.e. the thickness of the desalting compartment is preferably 1.5 to 15 mm, particularly 3 to 10 mm. As the size of the cells is reduced, the amount of the ion exchanger to be filled in one cell is reduced so that the fluidization of the ion exchanger is restrained. In addition, the strength of the partition member and the strength of the desalting compartment are increased. However, the pressure loss of the water flowing in the desalting compartment is increased.

The concentrating compartment in one aspect may have a thickness of 0.3 to 1 mm and may be provided with a spacer of 20 to 60 meshes therein.

The particle diameter of the ion exchange resin is preferably 0.1 to 1 mm, particularly 0.2 to 0.6 mm. According to a preferable way of filling the ion exchanger, the ion exchange resin corresponding to 100 to 140% of the volume of the cells are introduced into the cells and, after that, the cells are sandwiched between the ion exchange membranes so as to precisely fill the ion exchange resin in the cells.

According to another way of filling the ion exchange resin in the cells, after the ion exchange resin is filled in the cells and the ion exchange membranes are disposed on the opposite sides of the desalting compartment, raw water is supplied to swell the ion exchanger inside the cells and, after that, the frames and the membranes are tightened up such that the volume ratio becomes 100 to 102%.

The concentrating compartment in another aspect may be filled with ion exchange resin. The concentrating compartment filled with an ion exchange resin allows electric current to easily pass the inside thereof and intensifies turbulence of water inside thereof, thus improving the efficiency of electric current. As the same manner in the desalting compartment, a partition member may be arranged in the concentrating compartment to form a plurality of cells therein and an ion exchange resin may be filled in the respective cells.

Normally, acid anode water passed through the anodic compartment is introduced to the cathodic compartment and neutralized therein, because the cathodic compartment is generally alkaline. The neutralization lowers the conductivity and partially increases the voltage of the cathodic compartment, so that scales are easy to form. Therefore, it is preferable to employ as the cathode a mesh electrode, a non-woven fabric electrode, or a combination thereof because such an electrode has a large electrode area, thereby lowering the current density on the electrode surface and thus preventing precipitation of scales.

For operating the electrodeionization apparatus of the present invention, it is preferable to circulate concentrated water and to control the circulated water so as to have an ion concentration 5 to 40 times higher than the feed water. In this case, it is preferable to electrically separate and discharge hardness i.e. scale ingredients in the concentrated water so as to make the Langelier Index in the circulated water negative. A weak acid ion exchange resin may be used for removing hardness elements.

EXAMPLES AND COMPARATIVE EXAMPLES

Hereinafter, Examples 1 and 2, Referential Examples 1 and 2, and Comparative Examples 1 and 2 will be described.

An electrodeionization apparatus used in Examples and Comparative Examples has desalting compartments having a structure as shown in FIGS. 1 to 4, and concentrating compartments having three ribs extending vertically therein, respectively.

The desalting compartments and the concentrating compartments have a width of 130 mm and a height of 400 mm, respectively. The desalting compartments have a thickness of 5 mm, and the concentrating compartments have a thickness of 2.5 mm.

The apparatus has three desalting compartments and four desalting compartments, and they are alternately arranged as shown in FIG. 6. As shown in FIG. 6, electrode compartments are located on the outsides of both the concentrating compartments which are located at the outest sides, respectively. Raw water is introduced into each concentrating compartment to flow therethrough as concentrated water. The water counterflows in each concentrating compartment relative to each desalting compartment by one pass.

Cells in the desalting compartment are hexagonal as shown in FIGS. 1 to 4. The length of one side of each hexagon is 16.1 mm. The vertical wall portions of the partition member forming each cell are made of polypropylene, and the slantwise mesh portions thereof are made of polyester.

The cells of each desalting compartment was filled with a mixture of an anion exchange resin and a cation exchange resin. Mixing ratios of the anion exchange resin and the cation exchange resin were as follows. In Examples 1 and 2, the boundary B was located at the middle of the desalting compartment in the vertical direction. In Comparative Examples 1 and 2, and Referential Examples 1 and 2, the mixing ratio of the anion exchange resin and the cation exchange resin was uniform throughout the desalting compartment.

Example 1 upper stream zone: 75% lower stream zone: 60%

Example 2 upper stream zone: 60% lower stream zone: 75%

Comparative Example 1, Referential Examples 1 and 2 70%

Comparative Example 2 60%

Each concentrating compartment was filled with a mixture of the anion exchange resin and the cation exchange resin in which the mixing volume ratio was 4:6. Each electrode compartment was filled with the cation exchange resin.

Other operation conditions were as follows:

Raw water: Water prepared by treating city water with a reverse osmosis membrane, having a concentration of carbonic acid of 18 mgCO$_2$/L, a concentration of Na ion of 760 ppb (110 ppb in Referential Example 1) and a conductivity of 10 μS/cm (1 μS/cm in Referential Example 1).

Flow rate in the desalting compartment :190 L/h

Flow rate in the concentrating compartment :40 L/h

Voltage: 20V

Current: 4 A

Current density: 800 mA/dm$^2$ (200 mA/dm$^2$ in Referential Example 2)

Current efficiency: 20%

The qualities of treated water thus obtained are shown in Table 1. According to Table 1, by providing a highly excessive zone of the anion exchange resin in the upper zone or the lower zone of the desalting compartment and a slightly excessive zone of the anion exchange resin in the opposite zone of the same desalting compartment, carbonic acid was removed without increasing voltage even when the apparatuses were operated at a current density of 800 mA/dm$^2$ to treat the raw water having a concentration of Na ion of 300 ppb or more.

According to Referential Example 1 in which the raw water had a low concentration of Na ion, the raw water having a good condition did not cause increase of voltage. According to Referential Example 2, in which the current density was low when the treatment was executed, the low current density did not cause increase of voltage.

TABLE 1

| No. | Ratio of Anion exchange resin | | | Concentration of Na ion [ppb] | Current density [mA/dm$^2$] | Increase of Voltage | Resistivity [MΩ · cm] |
| --- | --- | --- | --- | --- | --- | --- | --- |
| | upper 20 cm | lower 20 cm | total | | | | |
| Example 1 | 75% | 60% | 68% | 760 | 800 | none | 12.8 |
| Example 2 | 60% | 75% | 68% | 760 | 800 | none | 14.5 |
| Comparative Example 1 | 70% | 70% | 70% | 760 | 800 | increase | 14.7 |
| Referential Example 1 | 70% | 70% | 70% | 110 | 800 | none | 15.2 |
| Referential Example 2 | 70% | 70% | 70% | 760 | 200 | none | 7.8 |
| Comparative Example 2 | 60% | 60% | 60% | 760 | 800 | none | 3.4 |

What is claimed is:

1. An electrodeionization apparatus comprising:

a cathode;

an anode;

concentrating compartments into which concentrated water is introduced;

desalting compartments for desalting water, said concentrating compartments and desalting compartments being alternately formed by arranging a plurality of cation exchange membranes and a plurality of anion exchange membranes alternately between the cathode and the anode, each of the desalting compartments having an upper stream zone and a lower stream zone; and ion exchange resins filled in the desalting compartments, said ion exchange resins comprising an anion exchange resin and a cation exchange resin, said anion exchange resin and cation exchange resin being completely mixed together throughout each of the desalting compartments, wherein when a mixing ratio of the anion exchange resin to a total amount of the anion exchange resin and the cation exchange resin is expressed as A volume % at the upper stream zone in each of the desalting compartment and expressed as B volume % at the lower stream zone in each of the desalting compartment, A is 66 to 80 and B is 50 to 65; or A is 55 to 65 and B is 66 to 80.

2. The electrodeionization apparatus as claimed in claim 1, wherein A is 66 to 80 and B is 50 to 65.

3. The electrodeionization apparatus as claimed in claim 1, wherein A is 50 to 65 and B is 66 to 80.

4. The electrodeionization apparatus as claimed in claim 1, wherein each of said desalting compartments comprises partition members for dividing said each of the desalting compartment into a plurality of cells separated from each other.

5. The electrodeionization apparatus as claimed in claim 4, wherein said anion exchange resin and cation exchange resin are completely mixed together in each of the cells, and each the cells in the upper stream zone and the lower stream zone has the A volume % and the B volume %.

6. The electrodeionization apparatus as claimed in claim 1, wherein a boarder of the upper stream zone and the lower stream zone is located in a range from 40% to 60% of each of the desalting compartments relative to an inlet thereof.

7. An electrodeionization method for deionizing water, comprising the step of introducing the water into an electrodeionization apparatus, said electrodeionization apparatus comprising:

a cathode;

an anode;

concentrating compartments into which concentrated water is introduced;

desalting compartments for desalting the water, said concentrating compartments and desalting compartments being alternately formed by arranging a plurality of cation exchange membranes and a plurality of anion exchange membranes alternately between the cathode and the anode, each of the desalting compartments having an upper stream zone and a lower stream zone; and ion exchange resins filled in the desalting compartments, said ion exchange resins comprising an anion exchange resin and a cation exchange resin, said anion exchange resin and cation exchange resin being completely mixed together throughout each of the desalting compartments, wherein when a mixing ratio of the anion exchange resin to a total amount of the anion exchange resin and the cation exchange resin is expressed as A volume % at the upper stream zone in each of the desalting compartment and expressed as B volume % at the lower stream zone in each of the desalting compartment, A is 66 to 80 and B is 50 to 65; or A is 55 to 65 and B is 66 to 80.

8. An electrodeionization method as claimed in claim 7, wherein the electrodeionization apparatus is operated at an electric density of 300 mA or more.

9. An electrodeionization method as claimed in claim 7, wherein the electrodeionization apparatus treats the water to be treated having an Na ion concentration of 300 ppb or more.

* * * * *